United States Patent [19]

Dalisa et al.

[11] Patent Number: 5,076,668
[45] Date of Patent: * Dec. 31, 1991

[54] GAIN REFLECTOR-LIQUID CRYSTAL DISPLAY

[75] Inventors: Andrew L. Dalisa, Cupertino; James McCoy, San Jose; Richard Wiley, Los Altos, all of Calif.

[73] Assignee: Taliq Corporation, Sunnyvale, Calif.

[*] Notice: The portion of the term of this patent subsequent to Sep. 15, 2004 has been disclaimed.

[21] Appl. No.: 556,899

[22] Filed: Jul. 23, 1990

Related U.S. Application Data

[63] Continuation of Ser. No. 147,756, Jan. 25, 1988, Pat. No. 4,991,940.

[51] Int. Cl.$^5$ .............................................. G02F 1/133
[52] U.S. Cl. ............................................ 359/51; 359/70
[58] Field of Search ...................... 350/334, 338, 129

[56] References Cited

U.S. PATENT DOCUMENTS

| | | | |
|---|---|---|---|
| 3,905,682 | 9/1975 | Meyerhofer | 350/338 |
| 4,106,859 | 8/1978 | Doriguzzi et al. | 350/338 |
| 4,128,312 | 12/1978 | Lim et al. | 350/336 |
| 4,235,513 | 11/1980 | Vlahos | 350/125 |
| 4,241,980 | 12/1980 | Mihalakis et al. | 350/129 |
| 4,264,147 | 4/1981 | Baur et al. | 350/345 |
| 4,298,249 | 11/1981 | Gloor et al. | 350/338 |
| 4,435,047 | 3/1984 | Fergason | 350/347 V |
| 4,456,336 | 6/1984 | Chung et al. | 350/338 |
| 4,556,289 | 12/1985 | Fergason | 350/347 E |
| 4,579,423 | 4/1986 | Fergason | 350/347 V |
| 4,591,233 | 5/1986 | Fergason | 350/344 |
| 4,596,445 | 6/1986 | Fergason | 350/339 F |
| 4,616,903 | 10/1986 | Fergason | 350/347 V |
| 4,636,786 | 1/1987 | Haertling | 350/392 |
| 4,648,691 | 3/1987 | Oguchi et al. | 350/338 |
| 4,693,560 | 9/1987 | Wiley | 350/335 |
| 4,732,441 | 3/1988 | Cheng | 350/125 |
| 4,732,456 | 3/1988 | Fergason et al. | 350/334 |
| 4,832,458 | 5/1989 | Fergason et al. | 350/338 |

Primary Examiner—Stanley D. Miller
Assistant Examiner—Anita Pellman Gross
Attorney, Agent, or Firm—Heller, Ehrman, White & McAulifee

[57] ABSTRACT

A display apparatus comprising a display medium and a gain reflector disposed behind the display medium for reflecting incident light. The display medium may comprise a liquid crystal material containing a dye that conforms to the structure of the liquid crystal material and a containment medium for inducing distorted alignment of the liquid crystal material which in response to such alignment scatters and absorbs light and which response to a prescribed input reduces the amount of such scattering and absorption.

14 Claims, 4 Drawing Sheets

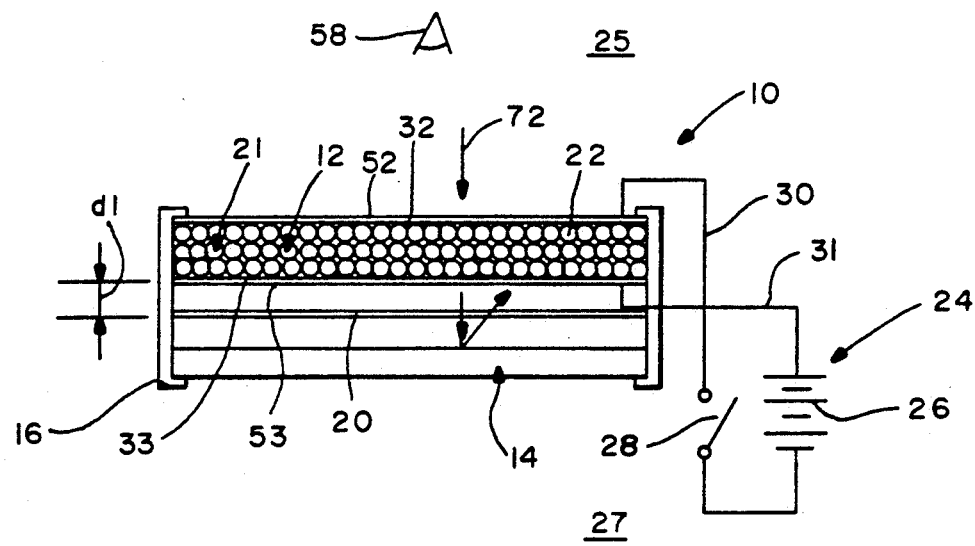
FIG.—1
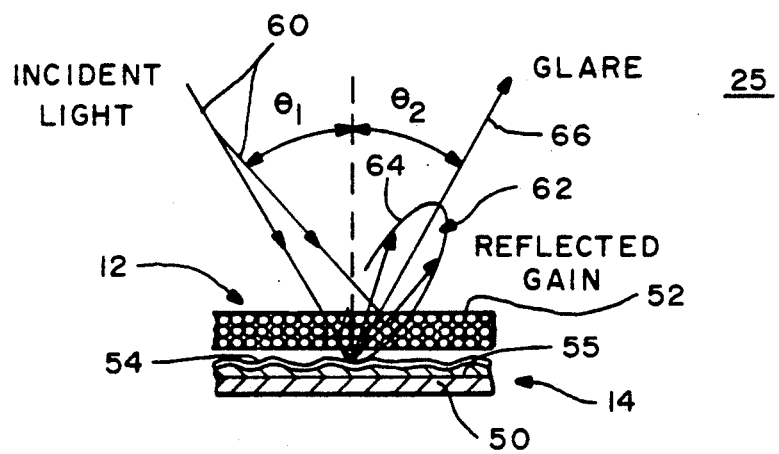
FIG.—2
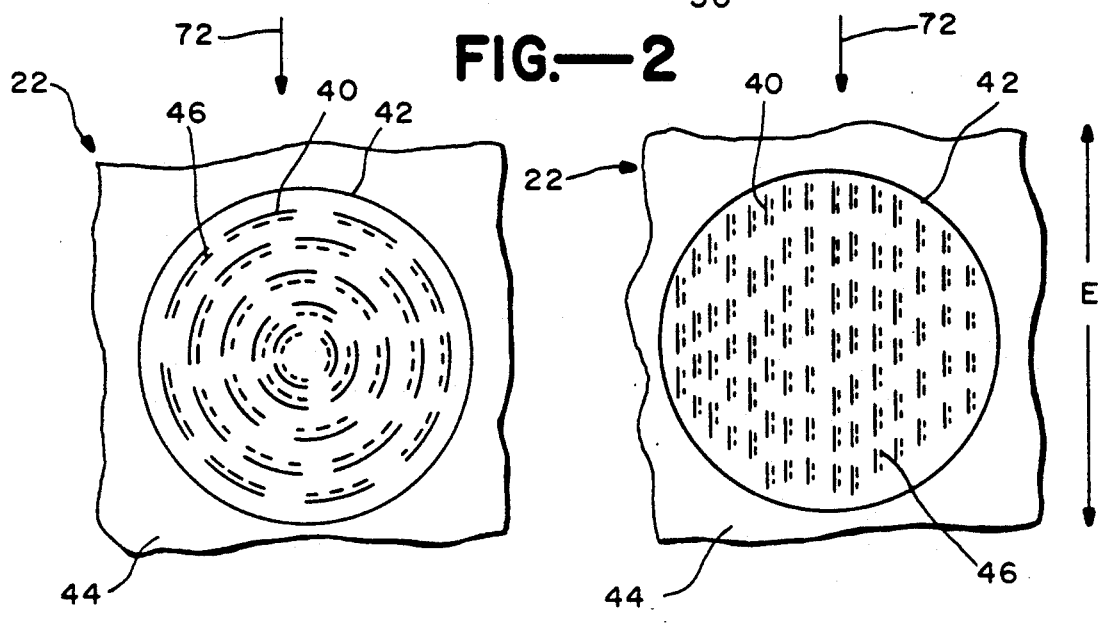
FIG.—3  FIG.—4

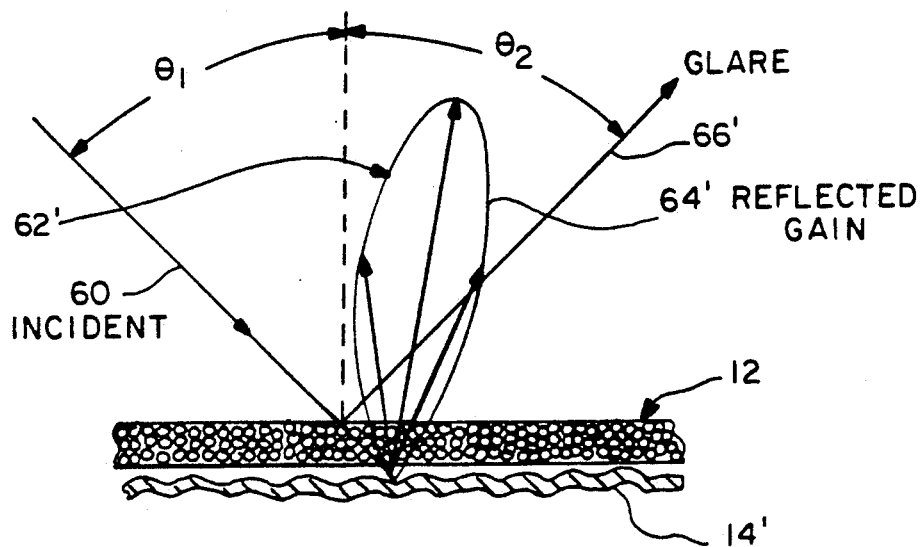
FIG. —5
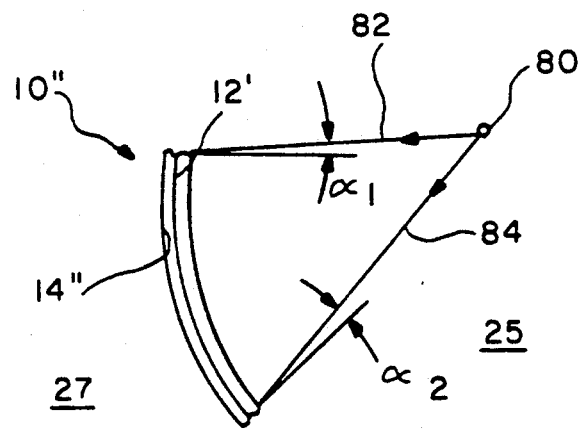
FIG. —9

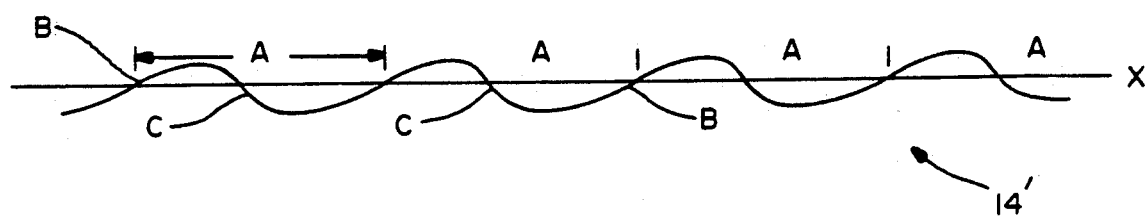
FIG.—7
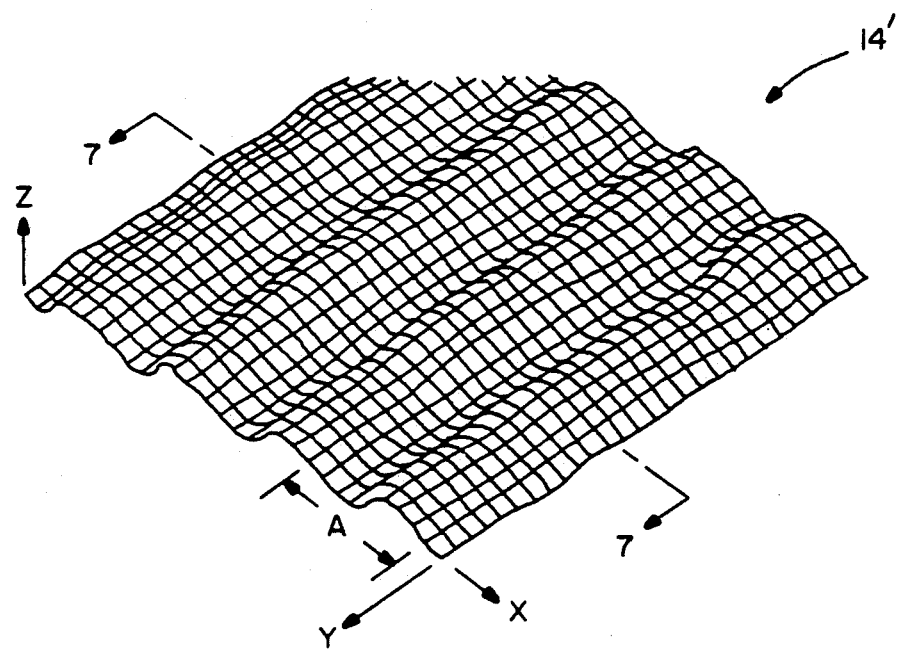
FIG.—6

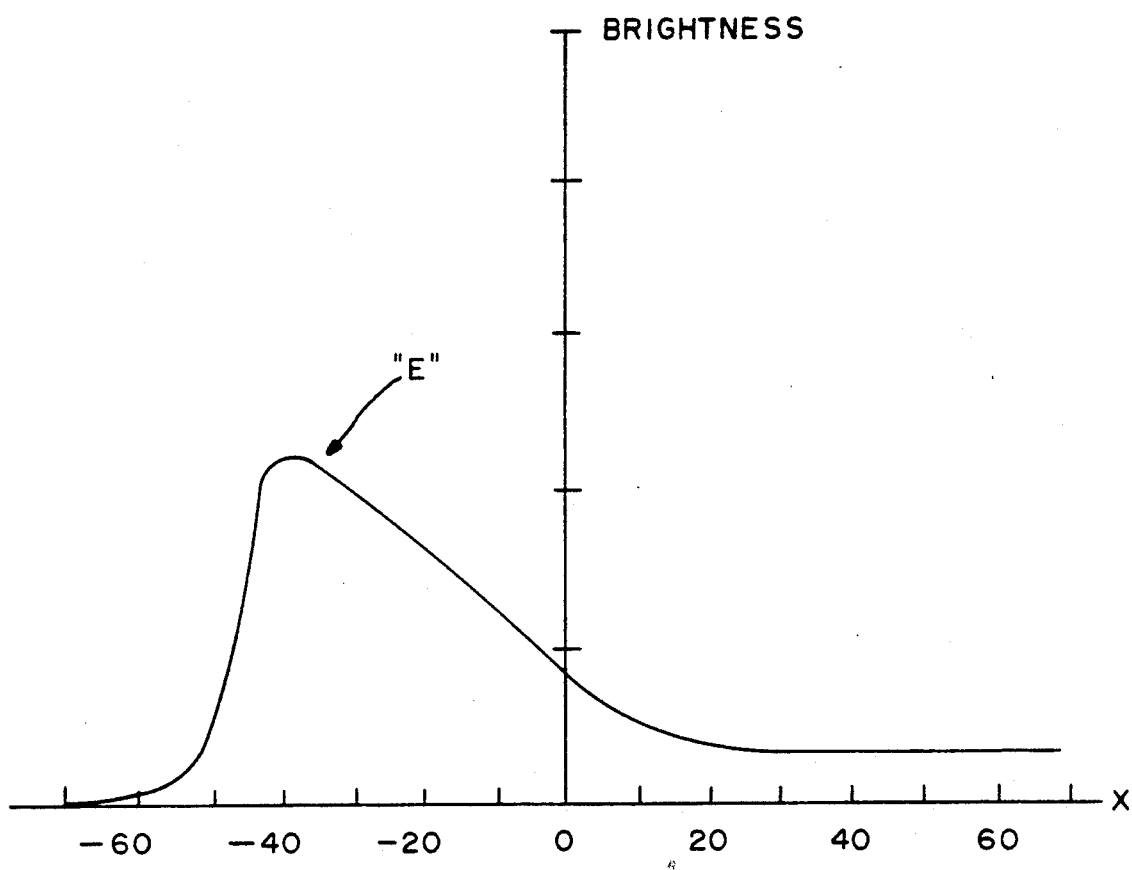
FIG.—8

GAIN REFLECTOR-LIQUID CRYSTAL DISPLAY

This is a continuation of application Ser. No. 147,756 filed 1/25/88 now U.S. Pat. No. 4,991,940.

BACKGROUND OF THE INVENTION

The present invention relates generally to displays, and more particularly to displays utilizing a gain reflector and a display medium that may be switched between light scattering and non-scattering states.

Visual display devices may utilize liquid crystals. The property of liquid crystals that makes them particularly useful in visual displays of the type of the present invention is the ability of certain liquid crystals materials to transmit light in a strictly aligned or non-scattering state, and to scatter light and/or to absorb it especially when combined with an appropriate dye, in a relatively free or scattering state. An electric field may be selectively applied across the liquid crystals to switch between scattering an non-scattering states.

It is desirable that liquid crystal visual displays have excellent contrast between the characters displayed and the background, and high brightness in all ambient light conditions. It is also desirable that the display be free of front surface glare.

The present invention relates in a preferred embodiment described hereinafter to the use of a liquid crystal as a display medium that may be designated encapsulated operationally nematic liquid crystal material or nematic curvilinearly aligned phases ("NCAP") liquid crystal material.

A detailed explanation of operationally nematic or NCAP liquid crystal material is provided in U.S. Pat. No. 4,616,903 issued Oct. 14, 1986, in the name of Fergason, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, in the name of Fergason, entitled ENCAPSULATED LIQUID CRYSTAL AND METHOD, assigned to Manchester R&D Partnership, which disclosure is also hereby incorporated by reference.

In the field-off condition, or any other condition which results in the liquid crystal being in a distorted or randomly aligned state, the NCAP liquid crystal material scatters incident light. In the field-on condition, incident light is transmitted through the NCAP material.

A pleochroic dye may be present with the liquid crystal material to provide substantial attenuation by absorption in the field-off state but to be substantially transparent in the field-on state. Any reference to the ability of liquid crystal to scatter and/or absorb light in accordance with the present invention should not be limited to the scattering and minimal absorption properties of liquid crystal but should include the additional properties pleochroic dyes may impose on the optical properties of the liquid crystal.

The display medium of the display of the present invention may also comprise other scattering-type display materials, e.g., dynamic scattering liquid crystal systems or ferroelectric ceramic systems comprising optically clear $(Pb,La)(Zr,Ti)(O_3)$ ("PLZT"). The dynamic scattering and PLZT display mediums are both switchable between light scattering and non-scattering states.

In reflective liquid crystal displays utilized heretofore, the use of a gain reflector can produce higher brightness in the field-on state when the illumination on the display is collimated or quasi-collimated. However, in the field-off state, brightness is also increased, thereby providing little or no improvement in the contrast ratio. When the illumination on such displays is diffuse, the gain reflector will not affect the brightness at all.

The present invention relates to improvements in reflective displays utilizing a display medium variable between light scattering and non-scattering states. The present invention also relates to the use of the light scattering and absorption characteristics of NCAP liquid crystal materials. The invention further relates to the use of such liquid crystal materials and characteristics, together with a pleochroic or diochroic dye, for example, to obtain relatively high contrast and dark characters or information displayed on a relatively bright background in both small and large size displays.

An object of the present invention is to provide a display having a relatively high contrast as well as brightness.

A further object of the present invention is to provide a display that has excellent contrast and high brightness in all ambient light conditions.

Another object of the present invention is to improve the performance of a display in viewing conditions where glare is present.

SUMMARY OF THE INVENTION

As may be seen hereinafter, the display disclosed herein is one which comprises a display medium disposed at a viewing side of the display. The display medium is switchable between a first state in which incident light is at least one of scattered and absorbed, and a second state in which the amount of such scattering or absorption is reduced. A gain reflector means for reflecting light transmitted by the display medium is located behind the display medium.

The display medium may comprise a liquid crystal material containing a dye that conforms to the structure of the liquid crystal material and a containment medium means. The containment medium means induces a distorted alignment of the liquid crystal material which in response to such alignment scatters and absorbs light and which in response to a prescribed input induces the amount of such scattering and absorption.

The gain reflector means may be an offset gain reflector that provides that specular reflection or glare is angularly offset from the reflected gain, i.e., light reflected by the offset gain reflector. The display may also include a color filter or lens disposed between liquid crystal means and the gain reflector means.

In accordance with one aspect of the present invention, a liquid crystal display can produce relatively bright or white characters, information, etc. on a relatively dark background in collimated, quasi-collimated or diffuse lighting conditions. The dark background may be produced by liquid crystal material that is randomly aligned in the field-off state wherein light incident on the liquid crystal material is scattered and absorbed. The bright characters are caused, for example, by liquid crystal material that is in a field-on state or in ordered alignment and thus, substantially optically transparent. When the liquid crystal material is in the field-off state, only the relatively dark background appears. When a selected portion of the liquid crystal material is in order alignment, the field-on state, a very bright character will appear against the dark background to an observer within a viewing angle of the display.

BRIEF DESCRIPTION OF THE DRAWINGS

The display of the present invention will be described in more detail hereinafter in conjunction with the drawings wherein:

FIG. 1 is a schematic, side elevational view illustrating a display apparatus in accordance with the present invention;

FIG. 2 is a schematic view illustrating the gain reflector component of the display apparatus of the present invention;

FIGS. 3 and 4 are schematic illustrations of a liquid crystal material used in the invention including a volume of liquid crystal with a dye in a containment medium means with the liquid crystal structure in distorted and parallel alignment, respectively;

FIG. 5 is a schematic view illustrating an offset gain reflector that may be utilized in the display apparatus of the present invention;

FIG. 6 schematically and perspectively illustrates a form of an offset gain reflector that may be utilized in the present invention;

FIG. 7 is a view along line 7—7 of FIG. 6;

FIG. 8 graphically and schematically illustrates a reflected light pattern from an offset gain reflector that may be utilized in the display apparatus of the present invention; and FIG. 9 is a schematic view illustrating another embodiment of the display apparatus of the present invention.

DESCRIPTION OF THE PREFERRED EMBODIMENTS

Referring now to the drawings, wherein like reference numerals for like components are utilized throughout the drawings, attention is first directed to FIG. 1. FIG. 1 shows a liquid crystal display apparatus indicated generally by reference numeral 10.

The display 10 includes two main components: a display medium 12 and a gain reflector 14. Display medium 12 is at a viewing side 25 of display 10. The gain reflector 14 is at a non-viewing side 27. A color filter 20 may be located in between display medium 12 and gain reflector 14.

The display may further include a frame 16. The frame may comprise a plastic housing that provides environmental protection for the display medium and the gain reflector.

The display medium comprises a material that may be switched between a light scattering and a non-scattering state, e.g., a NCAP liquid crystal material, a dynamic scattering liquid crystal material or a ferroelectric ceramic such as PLZT, all of which are discussed in more detail hereinafter. These materials as utilized in the present invention produce displays having better contrast ratios then heretofore possible.

When a gain reflector is utilized with standard twisted nematic and guest-host liquid crystals, both the field-on and field-off states are increased in brightness. Although the brightness is increased, the contrast ratio of the display remains the same. The perceived appearance of such a display may be slightly better than without the gain reflector. In some cases, the appearance may be worse.

However, in the display of the present invention, a major difference occurs when the display is switched between the scattering and non-scattering states. The effective gain of a gain reflector depends upon the degree of collimation of the incident light. In the scattering state, light incident upon the reflector will be relatively diffuse. The gain of the reflector for diffuse illumination will be close to unity. In the non-scattering state, light incident on the reflector may be much more collimated (depending upon the design of the illumination system) and therefore the effective gain will be greater than unity.

For example, displays of the present invention utilizing the NCAP liquid crystal material, have been found to have effective gains of 2.2 in the non-scattering state and 1.1 in the scattering state. Thus, the brightness in the field-on state is increased by a factor of 2.2 and the contrast ratio (contrast ratio = brightness (on) X gain/brightness (off) X gain) is doubled for displays having an effective gain of 2.2 in the field-on state and 1.1 in the field-off state.

Needless to say, higher brightness with higher contrast produces major improvements in display performance and appearance.

The display medium 12 of the present invention may comprise a liquid crystal cell 21 that includes a liquid crystal material 22. The optical characteristics of the liquid crystal material according to the invention are a function of whether or not a prescribed input is applied to the liquid crystal material. The prescribed input is preferably of the electromagnetic type and, more particularly, an electric field.

A schematic representation of a circuit 24 for selectively applying or not an electric field to the liquid crystal material 22 is illustrated in FIG. 1. Such a circuit 24 may include an electric power supply 26, such as a battery, and a switch 28. The electric power supply may alternatively be a source of alternating current. The circuit 24 is connected by electrical leads 30, 31 to electrodes 32, 33 positioned on opposite sides or surfaces of liquid crystal material 22 of cell 21.

The electrodes 32, 33 are substantially optically-transparent, and may be formed on optically-transparent substrates 52, 53, respectively.

Operationally, with switch 28 open, no electric field is applied to the liquid crystal material, which then is in the so-called de-energized (field-off) condition or mode, or scattering light state. With switch 28 closed, an electric field is applied across the liquid crystal material, which then goes into the so-called energized (field-on) condition or mode, or non-scattering light state. The operational characteristics of the display will depend on the scattering or non-scattering condition of the liquid crystal material 22, as is described in further detail below.

The liquid crystal material 22 preferably is of the type (NCAP) disclosed in U.S. Pat. No. 4,435,047. As is represented schematically in FIG. 3, such liquid crystal material 22 preferably is formed of operationally nematic liquid crystal 40 in a plurality of volumes 42 formed in or defined by a containment medium 44. The liquid crystal 40 preferably is optically transparent, and the containment medium preferably also is optically transparent. In the embodiment illustrated, preferably the liquid crystal material 22 was mixed therewith a dye 46, for example a pleochroic or diochroic dye. However, a liquid crystal material without a dye may be utilized to form the display medium.

Each volume 42 may be discrete or alternatively the liquid crystal 40 may be contained in a containment medium, such as a polymer encapsulant that tends to form a multitude of capsule-like environments containing the liquid crystal material. The liquid crystal 40 may be more or less confined to an approximately spherical or otherwise curvilinear surface of a containment cavity. Such cavities, however, may be interconnected, for example, by one or more channels or passages. The liquid crystal would preferably be in both the discrete volumes or cavities and in the interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

The pleochroic dye 46 in the liquid crystal 40 will absorb some of the light transmitted therethrough, and the degree of such absorption is a function of whether or not an electric field is applied to the liquid crystal material and of the magnitude of such field. Preferably such absorption in the field-on condition of the liquid crystal should be zero or as close to zero as possible to maximize transmission of incident light.

The dye alignment follows the alignment of the liquid crystal 40, as is illustrated schematically in FIGS. 3 and 4, for example, and is explained in further detail in the above-mentioned patent. Therefore, when the liquid crystal structure is in distorted alignment, the dye will provide a relatively substantial amount of light absorption. However, when the liquid crystal 40 is in parallel alignment, e.g., like that liquid crystal shown in FIG. 4, light absorption by the dye will be minimized. As the magnitude of electric field is increased or decreased, the amount of distortion of the liquid crystal material will vary, and the amount of absorption by the dye also will correspondingly vary.

In field-on operation, i.e. the non-scattering state, as shown in FIG. 4, the liquid crystal structure is considered to assume a generally parallel alignment. Since the ordinary index of refraction of the liquid crystal 40 in field-on condition is matched to that of the containment medium 44, the liquid crystal material 22 becomes essentially optically transparent and light incident thereon is not refracted at interfaces between the liquid crystal and containment medium. During such field-on operation, incident light is transmitted through liquid crystal cell 21.

Field-off operation, i.e. the scattering state, of the display is depicted in FIG. 3. Light which is incident on liquid crystal material 22 is refracted, scattered and absorbed. Such scattering is effected because the extraordinary index of refraction of the liquid crystal 40 is different from the index of refraction of the containment medium 44. The light is absorbed by the dye 46.

The index of refraction of the liquid crystal varies depending on whether an electric field is applied across the liquid crystal material. The index of refraction of containment medium 44 and the ordinary index of refraction (the index when an electric field E is applied) of the liquid crystal 40 should be matched as much as possible when in the field-on state to avoid scattering, thereby tending to maximize light transmission. However, when the liquid crystal is in the field-off state, there will be a difference in the indices of refraction at the boundary of the liquid crystal 40 and the containment medium.

In the field-off state, the containment medium tends to distort the natural liquid crystal structure to present to a great extent at the interfaces of the liquid crystal and surfaces, the extraordinary index of refraction (the index with no electric field E) characteristic of the liquid crystal; and such extraordinary index of refraction is different from the index of refraction of the containment medium. Therefore, when in such distorted alignment condition, there is a difference in the indices of refraction at the interface between the liquid crystal and containment medium, which causes refraction and, thus, scattering of light incident thereon.

As long as the ordinary index of refraction of the liquid crystal is closer to the index of refraction of the containment medium, than is the extraordinary index of refraction, a change in scattering will result when going from the non-scattering (FIG. 4) to scattering (FIG. 3) states, and vice-versa.

In accordance with the present invention, electrode 33 may, for example, form a common electrode surface while the opposed electrode 32 comprises patterned electrodes having multiple electrode portions that can be selectively energized to apply the electric field to selected portions of the liquid crystal material. For instance, as is well known in the art, electrode 32 may be divided into seven electrically isolated segments, each of which may be selectively energized to display various numerical characters. Electrode 32 may also be configured to form a dot matrix display comprising a plurality of dots or pixels arranged in column and rows. A row is enabled to accept display information in parallel via the column lines.

The liquid crystal material 22 including dye 46 may be prepared in the form of an emulsion of liquid crystal and containment medium which is subsequently dried or cured. Alternatively, as noted heretofore, the liquid crystal material may take the form of a plurality of individually formed capsules of liquid crystal in the containment medium.

In one embodiment, the containment medium is formed of a polyvinyl alcohol (PVA). In another embodiment, the liquid crystal is dispersed or entrapped in a latex containment medium. In either embodiment, substrates 52, 53 of liquid crystal cell 12 may comprise a polyester film, such as Mylar ®, that has been precoated with a layer of indium tin oxide (ITO) to form the electrodes. Preferably, the film has been precoated with a 80 to 500 ohms per square layer of ITO. Materials other than ITO may be used to form the electrodes of the apparatus of the present invention.

Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in application U.S. Pat. No. 705,209, filed Feb. 25, 1985, in the name of Pearlman, entitled LATEX ENTRAPPED NCAP LIQUID CRYSTAL COMPOSITION, METHOD AND APPARATUS, assigned to the assignee of the present invention, and which disclosure is hereby incorporated by reference.

In an alternative embodiment, the display medium 12 may comprise a liquid crystal cell that consists of a dynamic scattering liquid crystal material. As in the case of the above-described encapsulated operationally nematic liquid crystal material, a dynamic scattering liquid crystal material is switchable between light scattering and non-scattering states. As contrasted with the operationally nematic liquid crystal material, an electric field passed through a dynamic scattering liquid crystal material disrupts the alignment of the liquid crystal material such that light is scattered or refracted. However, in the field-off state, the dynamic scattering liquid crystal material is optically clear. Thus, the scattering effect in the dynamic scattering liquid crystal material is obtained when no electric field is applied.

Dynamic scattering liquid crystal materials are well known in the art, and as such, they will not be described in any detail herein. Dynamic scattering is described in the following articles, both of which are herein incorporated by reference: J. L. Fergason, et al., "Liquid Crystals and their Applications", *Electro-Technology*, January, 1970, p.41; and E. H. Heilmeier, et al., "Dynamic scattering: A new electro-optic effect in certain classes of nematic liquid crystals", *Proc. IEEE*, Vol. 56, p.1162, 1968.

Other types of liquid crystal materials that may be utilized as the display medium include twisted nematic and super twist liquid crystal materials. These materials are also well known to those skilled in the art, and are not described in any detail herein.

In yet another embodiment, display medium 12 may comprise a scattering/non-scattering ferroelectric ceramic system. Ferroelectric display systems are also well known in the art, and as such, they will not be described in detail. They may comprise optically clear (Pb,La)(Zr,Ti)O$_3$ ceramic materials (PLZT). The PLZT ceramic, like the encapsulated operationally nematic liquid crystal material and the dynamic scattering liquid crystal material, is switchable between light scattering and non-scattering states. The PLZT ferroelectric ceramic is described in the following articles, both of which are herein incorporated by reference: A. L. Dalisa, et al., "Convolution Scattering Model for Ferroelectric Ceramics and other Display Media", *Proc. IEEE*, Vol. 61, n. 7, pp. 981-991, July 1973. G. H. Heartling, et al., "Recent improvements in the optical and electro-optic properties of PLZT ceramics", *Ferroelectrics*, Vol. 3, p. 269, 1972.

The color filter 20, described above, is utilized to provide a color display. Filter 20 may be constructed from any transparent, non-scattering color material. For example, the color filter may be formed from colored glass or a dyed plastic material. The color filter, color sheet or lens 20 may be virtually any color, for example red, green, yellow, orange, etc.

Color filter 20 may be laminated to the front or back-side of display medium 12. Preferably, however, the filter is laminated to the back of the display medium.

Alternatively, as illustrated in FIG. 1, color filter 20 may be spaced from the back of display medium 12 such that an air gap exists therebetween, as is represented by spacing "d$_1$". If the electrodes of the display medium, are configured to form pixels the spacing "d$_1$" should be approximately less than 10% of the minor dimension of the pixels.

As discussed, the display medium 12 is switchable between a non-scattering (clear) state and a scattering (opaque) state. The colored material behind the display medium or portion thereof in the field-on state is visible to an observer or an observing instrument 58 on viewing side 25 of the display.

The color filter 20 may be eliminated, and instead gain reflector 14 may be selectively screen printed with colored dyes, for example fluorescent dyes, as shown generally by reference numeral 54. The colored dyes provide a colored pattern that can produce color for pixels in the display. The fluorescent dye increases brightness due to its ability to absorb light over a wide range of frequencies and then to emit this light at a particular color.

As shown in FIG. 2, incident light, represented by light beams 60, which is refracted when it passes through display medium 12, is reflected back from gain reflector 14 as light beams 62 that make up a gain lobe 64. The incident light is also reflected as glare, as will be explained in more detail below, from the surface of display medium 12.

The reflected light 62 is not uniformly distributed but is concentrated to some degree. The limiting case of a gain reflector would be that of a plane mirror. In that case, all the light in a collimated incident light beam remains collimated in the reflected beam, which is propagating in a direction such that the angle of incidence equals the angle of reflection. Depending upon the exact nature of the surface of the gain reflector, the light distribution in the reflected beam may be broad or narrow. The gain of such a reflector may be defined as the ratio of the light flux into a detector (with a fixed solid angle at a given angle to the surface) from the gain reflector to that from a Lambertian reflector.

As the incident light beam becomes less collimated, the distribution of reflected light from the gain reflector broadens and therefore the gain decreases. The limiting case occurs when the incident light beam, or illumination from viewing side 25, for example, is diffuse or Lambertian. This results in a Lambertian reflected light distribution, that is a gain of unity.

The gain reflector 14 may be any number of well known and readily available gain reflectors that provide light reflection of incident light. The gain reflector, for example, may comprise a retro-reflector where the reflected light is along the same path or line as the incident light beam.

More preferably, the gain reflector 14 provides that the reflected gain is along a path that is different from the incident light. Such a gain reflector, for example, is described in U.S. Pat. No. 4,456,336, issued June 26, 1984, the disclosure of which is hereby incorporated by reference. The gain reflector 14 may also comprise a lenticular surface that has a repeating, simple element, such as a spherical or cylindrical section, that is embossed into flexible PVC that is coated with aluminum pigment paint or other reflective media.

The gain reflector may further comprise, as shown in FIG. 2, an opaque, plastic or metal substrate 50 having a reflective coating 55. The coating can comprise a thin layer of silver or aluminum, for example a sputtered aluminum coating, that has a rough or uneven surface.

Another type of gain reflector that may be utilized in the display of the present invention is described in U.S. Pat. No. 4,241,980 (the "980 patent"), issued Dec. 30, 1980, in the name of Mihalakis, et al., entitled BEAM EMISSION CONTROL MEANS, assigned to William C. McGehon, the disclosure of which is hereby incorporated by reference. The gain reflector described in the '980 patent is commercially available from Protolite Corporation, Palo Alto, Calif. It is sold under the trademark Mirror Image. This gain reflector and a method of its manufacture are also described in a paper entitled: G.

Mihalakis, "Large Screen Projection Displays", *Proc. SPIE*, Vol 760, p. 29, 1987, which is herein incorporated by reference.

This gain reflector comprises an array of optical elements that are juxtaposed to form a matrix of rows and columns. These optical elements have both convex and concave image-forming portions such that the optical axes of the elements are at an angle to the normal to a substrate of the gain reflector. The individual optical elements typically have dimensions smaller than an observer can resolve at the determined viewing distance, and the convex and concave portions are shaped to provide overlapping images at that viewing distance.

As shown in FIG. 2, the glare or specular reflection, represented by light beam 66, is caused by light reflected by the planar reflective surface that is parallel to the principle plane of the gain reflector, i.e., the display surfaces comprising, e.g., the front and rear surfaces of display medium 12 including any transparent overlay or cover therefor. With the above-described gain reflectors, an observer or observing instrument 58 on viewing side 25 of the display not only receives the highest gain of reflected light but also the highest glare. This occurs because the gain lobe 64 (reflected gain), comprising reflected light beams 62, is distributed around the direction of the specular reflection (glare), light beam 66, that is the angle of incidence $\theta_1$ equals the angle of reflection $\theta_2$. However, if the viewer 58 moves out of the glare angle, the available gain decreases.

For this reason, it is advantageous to utilize an offset gain reflector, one that separates the direction of the specular reflection or glare from the direction of the reflected gain or light.

The light distribution field or pattern from a display having an offset gain reflector 14' is schematically illustrated in FIG. 5 where the reflected gain is represented by a light lobe 64', comprising light beams 62', and the specular reflection (the reflected glare) is represented by light beam 66'. As shown, the specular reflection or glare from the surfaces of display medium 12 is not in the same direction as the maximum brightness and contrast of the display, i.e., the specular reflection is angularly offset from light reflected (light beams 62') by the offset gain reflector.

The elimination of glare observable by an observer provides increased optical performance and further enhances the appearance of display 10.

The construction of a type of offset gain reflector 14' is schematically illustrated in FIGS. 6 and 7. The offset gain reflector illustrated is a modification of the gain reflector disclosed in the above-referenced '980 patent. More particularly, the optical elements of the offset gain reflector shown in FIGS. 6 and 7 comprise asymmetrical wave forms that angularly offset the reflected light. As discussed, this modified gain reflector produces the light distribution pattern illustrated in FIG. 5.

The mathematical surface of the gain reflector of the '980 patent is based on the joining (splining) together of individual low order curved optical elements in a manner which results in a shape with a continuous first derivative (tangent) and a defined second derivative (curvature). This is another way of saying that the optical elements are joined together smoothly, with no sharp edges. This two dimensional (splined) wave form is then modulated in a non-standard fashion by another wave form defined on the orthogonal axis. The result is a three dimensional surface of smoothly joined optical elements having, as discussed, both convex and concave image-forming portions. The optical power (the ability to spread light) of this array of elements is exactly the same as the optical power of a single element.

The single optical element in the gain reflector of the '980 patent may in principle be any smooth continuous function with two zero crossings; see, e.g., FIG. 6 where the "x"–"z" plane is the inflection or zero plane and all "x" direction waveforms undergo zero crossing. But, in practice, it has been restricted to second order functions, e.g., a circle, an ellipse, a parabola, or a hyperbola. The angle into which a ray of light will be reflected by an optical element will depend on the slope of the curve at the point of interest, i.e., the steeper the slope, the larger the angle. Thus, the boundaries of the light reflection pattern are determined by the steepest negative and positive slopes.

An important consequence of the fact that the distribution of light depends only on the slope of a surface of an optical elements is that the mirror image of this surface has identically the same light distribution. It has the same focal length, but of opposite sign.

A second important consequence of slope dependence is that the light distribution pattern is element size independent. The smaller element will intercept and act upon a smaller portion of the incoming light, but will distribute that light at the same angle or pattern as would a larger element. This is true whenever both the large and small elements have the same shape.

The surface consisting of a single row of three dimensional optical elements may be constructed by introducing some repeating wave form on the axis orthogonal to the primary wave form. This is done by making the element size proportional to the amplitude of the modulating wave. The surface of the gain reflector of the '980 patent is configured by joining to each element its mirror image sized in such a manner that the combined length of this compound element is held constant, independent of the size of the primary element. This pattern may be repeated indefinitely creating a continuous sheet or array of optical elements in rows and columns as described in the '980 patent.

The gain reflectors produced commercially by Protolite have been symmetric, and thus they produce symmetric light distribution fields or patterns.

The offset gain reflector 14' schematically illustrated in FIGS. 5–7 incorporates an asymmetric wave form element, which, as illustrated, may be a section of a rotated ellipse. Other asymmetrical forms, such as a rotated parabola, a rotated hyperbola or any high order curve, may be utilized to construct an offset gain reflector.

Specifically, the offset gain reflector 14' is made up of an array of asymmetrical optical elements "A" each, e.g., comprising a section of a rotated ellipse. As illustrated in FIG. 7, the result is a curve having a much greater portion of its length with a positive slope "B" than a negative slope "C". Since the positive and negative slope regions send reflected light to opposite sides, positive slope side "B", having more area, will receive more light. Furthermore, the positive slope side has less curvature and thus does not distribute light over as wide an angle as does the negative side "C". Since the distribution angle is smaller, the light remains more concentrated and thus brighter. The net result is an array or sheet of optical elements which, when light is directed normal to the elements, reflects that light in a distribution pattern which is brighter on one side than the other.

FIG. 8 illustrates the reflected light pattern from the above-described offset gain reflector wherein the angle of reflection from 0° is plotted on the "x" axis and brightness on the "y" axis. As shown, the offset gain reflector reflects incident light in a pattern that is brighter at "E", i.e., it is brighter on one side of the "y" axis than the other.

The offset gain reflector may be fabricated in the manner described in the above-discussed SPIE paper by Mihalakis, i.e., by utilizing a Computer Numerical Control micro-milling system to form the asymmetrical optical elements. Such an offset gain reflector can be manufactured by Protolite.

The optimum use of display 10 in quasi-collimated light depends to a great degree on controlling the angle of the light incident on different portions of display medium 12. Since in most applications, incident light is not completely collimated nor perpendicular to the display surface, different portions of display medium 12 and the gain reflector, for example the top and bottom surfaces, if the display is orientated vertically, will receive light at different angles. This will, in general, produce different optical performance and, therefore, noticeable differences in appearance.

However, in the embodiment illustrated in FIG. 9, the liquid crystal cell 12' and the gain reflector 14" are fabricated on thin flexible plastic substrates, for example, that may be curved (in one dimension) so that more of the surface of the liquid crystal cell and the gain reflector are at the same angle of incidence ($\alpha_1 = \alpha_2$) relative to a front illumination source 80 (light from source 80 is represented by beams 82,84) on viewing side 25 of display 10". In this embodiment, liquid crystal cell 12' most preferably comprises the encapsulated operationally nematic or NCAP liquid crystal material, and gain reflector 14" may be a sputtered aluminum coating, having an uneven surface, on the curved surface of the substrate. This configuration assists to ensure a uniform optical performance and appearance for the display. It is especially suitable for use for vehicle dashboard displays.

The display apparatus of the present invention is operable in all ambient lighting conditions to produce a display having excellent contrast and brightness. The display is effective at night (very low, less than 100 foot lamberts ("Fl"), or zero ambient light), in bright sun (ambient light greater than 1000 Fl), and on cloudy days or indoors (ambient light 100 to 1000 Fl).

As discussed, incident light, represented by light beam 60 (see FIGS. 2,5), is transmitted through the display medium, in the non-scattering state, where it is reflected, shown as light beams 62, by means of the gain reflector to create a display observable by an observer 58.

As noted, dye in the NCAP liquid crystal cell produces light absorption. For incident light that is quasi-collimated, the brightness of the display in the field-on state is increased because the light experiences little absorption or scattering as it passes through the liquid crystal cell. It is then reflected into a narrow distribution by the gain reflector and then passes through the liquid crystal cell again.

In the field-off state, incident light is strongly scattered and absorbed. Thus, the portion of the light that reaches the gain reflector is much more diffuse than the incident beam. Therefore the effective gain of the gain reflector will be much lower. Therefore, the display will be brighter and have a higher contrast.

When incident light is diffuse, the brightness in the field-on state is still increased by the gain reflector. This is caused by the differential absorption of light that enters the liquid crystal cell from different angles.

For instance, consider a light ray, represented by beam 72 (see FIGS. 1, 3–4) that is normal to the liquid crystal cell structure. Since, in the field-on state, the NCAP liquid crystal material is aligned by the electric field E there will be little scattering or absorption for light that is normal to the liquid crystal cell, such as light ray 72. For light rays at an angle from the normal, for example 45°, there will be significant absorption since these rays will not be traveling parallel to the field aligned liquid crystal 40 and the dye 42. Since light is more strongly scattered and absorbed the further its incident direction is from the normal to the surface of the liquid crystal cell, the transmitted light distribution is narrowed somewhat from the incident distribution. This narrow distribution will be reflected by the gain reflector with some gain.

In the field-off state, the liquid crystal cell will scatter and absorb the diffuse incident light and provide little or no gain. Therefore, even in diffuse lighting conditions, the combination of the gain reflector and the liquid crystal cell provide high brightness and contrast.

The display apparatus of the present invention, for the various modes of operation, displays the selected numeral, character or other information to an observer 58 on viewing side 25 within the viewing angle of the display. For example, to observer 58, the area between the energized electrodes may appear very light (or colored) against a very dark background. The liquid crystal material that is not located between the energized electrodes is in the field-off state. Thus, that material still scatters and absorbs incident light, creating a very dark appearance, from both the viewing and non-viewing sides.

The display of the present invention is adaptable to such displays as vehicle dashboards and control panels.

The display of the present invention produces unique display improvements including: (1) the overall brightness of the display when the display medium is in the non-scattering state is increased while the display brightness in the scattering state is not changed, yielding an increase in the contrast ratio when the display is illuminated by either collimated or quasi-collimated light; (2) an improvement in the brightness and contrast ratio of the display even when illuminated by diffuse light; and (3) the capability of angularly separating the reflected light distribution (reflected gain from the gain reflector) from the specular reflection (glare from the display medium in front of the gain reflector).

Although certain specific embodiments of the invention have been described herein in detail, the invention is not to be limited only to such embodiments, but rather only by the appended claims.

What is claimed is:

1. A display apparatus comprising:
    a liquid crystal means at a viewing side of the display;
    said liquid crystal means comprising a liquid crystal material in a containment medium means for inducing a distorted alignment of said liquid crystal material which in response to such alignment at least one of scatters and absorbs light and which in response to a prescribed input reduces the amount of such scattering and absorption; and
    a gain reflector means disposed behind said liquid crystal means for reflecting light passing through said liquid crystal means wherein the contrast ratio of the display is increased by the gain of said gain reflector.

2. A display apparatus comprising:

a liquid crystal means disposed at a viewing side of the display;

said liquid crystal means comprising operationally nematic liquid crystal containing a dye and a containment medium means for containing plural volumes of the liquid crystal and dye, said containment medium means having surface means for distorting the natural structure of the liquid crystal to cause the dye to increase light absorption, and the liquid crystal being responsive to a prescribed input to reduce the amount of such light absorption; and gain reflector means for reflecting light incident thereon, said gain reflector means disposed at a non-viewing side of the display behind said liquid crystal means wherein the contrast ratio of the display is increased by the gain of said gain reflector.

3. The apparatus of claim 2 wherein said gain reflector means provides that specular reflection from the display is angularly offset from the reflected gain.

4. The apparatus of claim 3 further including a color filter means disposed between said liquid crystal means and said gain reflector means.

5. The apparatus of claim 2 wherein said gain reflector means includes a pattern of fluorescent colors.

6. The apparatus of claim 2 wherein said gain reflector means comprises a plurality of similar units disposed in substantially contiguous relation, each unit including an emitting surface which is convex in a plane defined by first and second axes and concave in planes perpendicular thereto.

7. The apparatus of claim 2 wherein said gain reflector means comprises a roughened mirrored surface.

8. The apparatus of claim 2 wherein said liquid crystal means has electrode means formed at the opposite surfaces thereof for applying an electric field across said liquid crystal as the prescribed input.

9. The apparatus of claim 8 further comprising circuit means for providing electric energy to said electrode means to effect application of the electric field to said liquid crystal.

10. The apparatus of claim 2 wherein said liquid crystal means and said gain reflector means present a curved surface to an illumination source on a viewing side of the display.

11. The apparatus of claim 10 utilized as part of a vehicle dashboard and further including a front lighting source.

12. The apparatus of claim 2 utilized in a vehicle dashboard.

13. The apparatus of claim 1 wherein said liquid crystal is a high birefringent material and said dye is a pleochroic dye.

14. The apparatus of claim 1 wherein said gain reflector means comprises a plurality of similar units disposed in substantially contiguous relation, each unit including an emitting surface which is concave in a plane defined by first and second axes and convex in planes perpendicular thereto.

* * * * *